(12) United States Patent
Park

(10) Patent No.: US 6,728,180 B1
(45) Date of Patent: Apr. 27, 2004

(54) BLANK DETECTION CIRCUIT AND METHOD THEREFOR

(75) Inventor: Hyun-soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/557,008

(22) Filed: Apr. 20, 2000

(30) Foreign Application Priority Data

Apr. 20, 1999 (KR) .......................................... 1999-13983

(51) Int. Cl.$^7$ ................................................ G11B 7/00
(52) U.S. Cl. ................................. 369/53.11; 369/47.27
(58) Field of Search .......................... 369/47.18, 59.21, 369/53.11, 59.19, 124.01, 124.14, 59.17, 53.35, 124.45, 52.1, 53.12, 47.27, 47.17, 47.19, 47.32, 59.2, 275.1, 275.3, 59.12, 59.24

(56) References Cited

U.S. PATENT DOCUMENTS

| | | | | |
|---|---|---|---|---|
| 5,229,986 A | * | 7/1993 | Mizokami et al. ........ | 369/59.24 |
| 5,347,505 A | * | 9/1994 | Moritsugu et al. ........ | 369/59.12 |
| 5,629,914 A | * | 5/1997 | Clark et al. ............. | 369/124.15 |
| 5,654,953 A | * | 8/1997 | Yoshida et al. .......... | 369/275.1 |
| 5,708,640 A | * | 1/1998 | Fukuda et al. ........... | 369/47.17 |
| 6,118,745 A | * | 9/2000 | Hutchins et al. ......... | 369/124.01 |
| 6,307,822 B1 | * | 10/2001 | Shim et al. .............. | 369/47.18 |

FOREIGN PATENT DOCUMENTS

| | | |
|---|---|---|
| JP | 63-292464 | 11/1988 |
| JP | 4-117674 | 4/1992 |
| JP | 4-117675 | 4/1992 |
| JP | 7-22768 | 5/1995 |
| JP | 10-269574 | 10/1998 |
| JP | 11-149715 | 6/1999 |
| JP | 2000-155948 | 6/2000 |

* cited by examiner

*Primary Examiner*—William Korzuch
*Assistant Examiner*—Kim-Kwok Chu
(74) *Attorney, Agent, or Firm*—Staas & Halsey LLP

(57) ABSTRACT

A blank detection circuit and method which detects a blank of a reproduced signal read from a recording medium such as are optical disc and which includes an edge detector which detects edges of the reproduced signal and detects an interval between the detected edges, a maximum value/ minimum value detector which detects an amplitude of the reproduced signal in response to the detected edges and provides a maximum value or a minimum value of the detected amplitude, and a determiner which determines whether the reproduced signal is the blank according to the inter-edge interval detected in the edge detector and/or the maximum value or minimum value detected in the maximum value/minimum value detector. Since a blank component of the reproduced signal read from the optical disc is quickly detected, and a blank signal is generated at an accurate point in time, reliability of the entire system is enhanced.

26 Claims, 3 Drawing Sheets

BLANK DETECTION CIRCUIT AND METHOD THEREFOR

CROSS-REFERENCE TO RELATED APPLICATIONS

This application claims the benefit of Korean Application No. 99-13983, filed Apr. 20, 1999, in the Korean Patent Office, the disclosure of which is incorporated herein by reference.

BACKGROUND OF THE INVENTION

1. Field of the Invention

The present invention relates to signal reproduction technology, and more particularly, to a circuit and method of detecting a blank component with a playback signal read from an optical disc.

2. Description of the Related Art

A recording and/or reproducing apparatus for recording and/or reproducing data with respect to an optical disc such as a compact disc (CD) or a digital versatile disc (DVD) among recording media, emits a beam from an optical source such as a laser diode onto the surface of the disc, converts the intensity of light reflected from the disc surface into an electrical signal, and reads out the data recorded on the disc. Here, the electrical signal is referred to as a radio frequency (RF) signal. The RF signal is decoded into a binary signal and the decoded binary signal is used as necessary through a demodulation process.

However, since the disc surface has various flaws or polluted by dirt, the RF signal is not always detected as a certain value having a predetermined amplitude corresponding to the size of a recording mark. Also, data to be reproduced is logically continuous, but may lie scattered physically at various portions of the disc. Here, a pickup does not always move from the inner circumference of the surface of the disc to the outer circumference thereof sequentially. At times, the pickup may jump a predetermined distance on the disc surface. The RF signal detected at the instant time when the pickup jumps has a smaller amplitude than that of normal reproduction.

A signal indicating that a current signal is abnormal in the case that the abnormal RF signal has been detected is called a blank signal. The blank signal is provided to a phase locked loop (PLL) circuit (not shown) or a binary data decoder (which is called a slice circuit), which is used to hold the phase locked loop or stop the output of the binary data temporarily.

A conventional blank detection circuit has an analog configuration as shown in FIG. 1. A first hold circuit 12 detects an upper value of an input RF signal, and a second hold circuit 14 detects a bottom value of the input RF signal. If the upper and bottom values of the input RF signal are detected, a first comparator (COMP1) 16 compares the upper value with a first threshold value (TH1) and a second comparator (COMP2) 18 compares the bottom value with a second threshold value (TH2). As a result, if the upper value is smaller than the first threshold value (TH1) in the first comparator 16 or if the bottom value is larger than the second threshold value (TH2) in the second comparator 18, a blank signal is output through a logic device 20.

In the conventional art, since the first hold circuit 12 tracking the upper value of the input signal and the second hold circuit 14 tracking the bottom value of the input signal each use an analog low-pass filter, as shown in FIG. 1, it is not possible to perform quick tracking with respect to the input signal. Although a quick tracking is performed by increasing a critical frequency of the low-pass filter, a signal band of a long-term period included in the input RF signal is trespassed, and accordingly a blank signal is not detected well. That is, if the characteristic of the low-pass filter is too sensitive, a blank signal is detected at an unwanted position, while if the low-pass filter is not sensitive enough, a blank signal is not detected at a desired position. Thus, it is difficult to accurately detect a blank signal at a defective area or a position where a normal reproduced output is not detected as in a jump operation.

SUMMARY OF THE INVENTION

To solve the above problems, it is an object of the present invention to provide a blank detection circuit implemented by a digital circuit, in which an RF signal read from a recording medium such as a disc is converted into a digital signal.

It is another object to provide a blank detection method of detecting a blank of a signal read out from a recording medium such as a disc quickly and accurately.

Additional objects and advantages of the invention will be set forth in part in the description which and, in part, will be obvious from the description, or may be learned by practice of the invention.

To accomplish the above and other objects of the present invention, there is provided a blank detection circuit for detecting a blank of a reproduced signal read from a recording medium, the blank detection circuit comprising: an edge detector which detects edges of the reproduced signal and detects an interval between the detected edges, which is an inter-edge interval; a maximum value/minimum value detector which detects an amplitude of the reproduced signal in response to the edge and provides a maximum value or a minimum value of the detected amplitude; and a determiner which determines whether the reproduced signal is the blank according to the inter-edge interval detected in the edge detector and/or the maximum value or minimum value detected in the maximum value/minimum value detector.

To accomplish the above and other objects of the present invention, there is also provided a blank detection method of detecting a blank of a reproduced signal read from a recording medium, the blank detection method comprising: detecting edges of the reproduced signal and detecting an interval between the detected edges, which is an inter-edge interval; detecting an amplitude of the reproduced signal and providing a maximum value or a minimum value of the detected amplitude; and determining whether the inter-edge interval, the maximum value and/or the minimum value meet predetermined conditions, and if met, generating a blank signal.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENT

Figure 1:
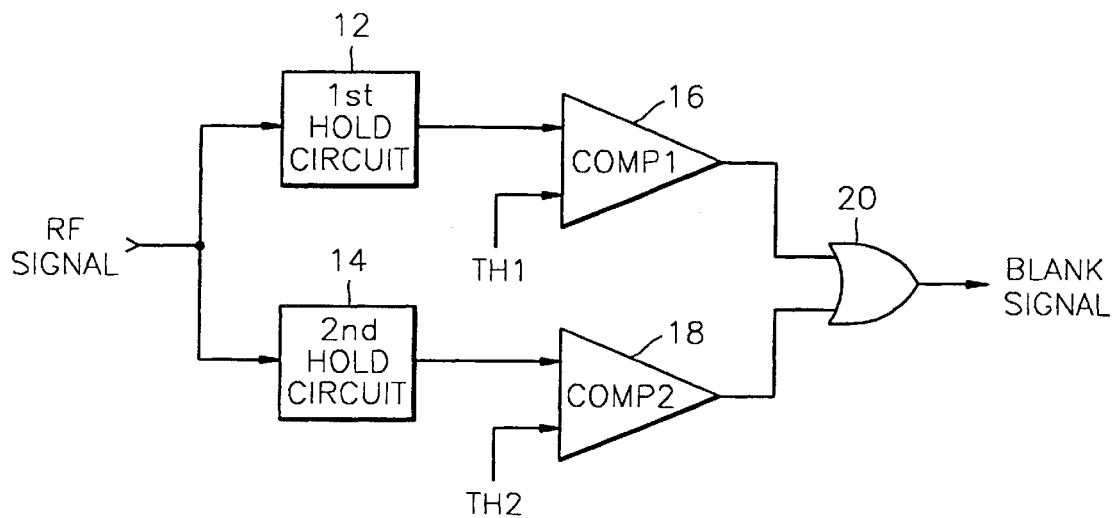
FIG. 1 is a circuit diagram showing a conventional blank detection circuit.

Reference will now made in detail to the present preferred embodiment of the present invention, examples of which are illustrated in the accompanying drawings, wherein like reference numerals refer to the like elements throughout. The embodiment is described below in order to explain the present invention by referring to the figures.

Figure 2:
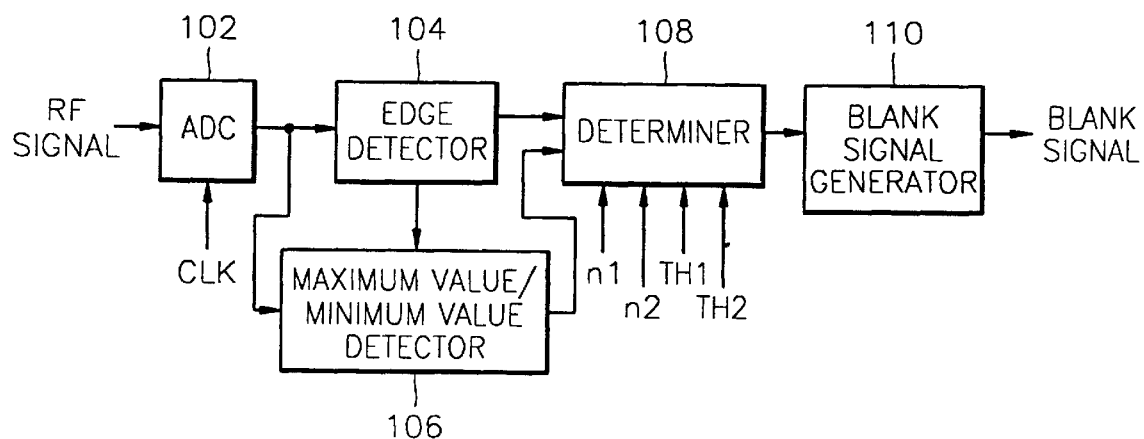
FIG. 2 is a block diagram showing a blank detection circuit according to an embodiment of the present invention.

In FIG. 2, a blank detection circuit includes an analog-to-digital converter (ADC) 102, an edge detector 104, a maximum value/minimum value detector 106, a determiner 108 and a blank signal generator 110.

The ADC 102 samples an input RF signal according to a clock signal CLK synchronized with a PLL, to thereby provide a digital reproduced signal. The edge detector 104 detects a sign of the digital reproduced signal provided from the ADC 102 to detect a point where the detected sign is changed as an edge, and counts the number of clock pulses between the edges (which is called an inter-edge interval). That is, the output signal of the ADC 102 is compared with a reference level value and a point where the sign of the compared result is changed from positive to negative or from negative to positive is detected as an edge, and then the number of clock pulses is counted until a next edge is detected. Each edge detected in the edge detector 104 is used to reset the maximum value/minimum value detector 106. The maximum value/minimum value detector 106 detects a maximum value or a minimum value with respect to the amplitude of a current digital reproduced signal in response to one of the edges detected in the edge detector 104, until a next edge is input.

The maximum value/minimum value detector 106 determines whether the reproduced signal output from the ADC 102 is positive or negative in response to each edge detected in the edge detector 104, detects the maximum value when the reproduced signal is positive and detects the minimum value when the reproduced signal is negative.

The determiner 108 can be implemented by comparators, which compare the number of clock pulses between the edges provided from the edge detector 104 with a first predetermined value n1. If the inter-edge clock pulse number is larger than the first predetermined value n1, that is, in the case that the sign of the input signal is not changed for a certain period of time, the determiner 108 determines the current signal as a blank signal. If the inter-edge clock pulse number is larger than a second predetermined value n2, the maximum value provided from the maximum value/minimum value detector 108 is compared with a first threshold value TH1 and the minimum value is compared with a second threshold value TH2, to thereby determine whether the current signal is a blank signal. The blank signal generator 110 can be implemented by a logic circuit, which generates a blank signal if the comparison result of the determiner 108 is determined as a blank signal. The blank signal generator 110 can be implemented within the determiner 108.

Here, there are three conditions for blank determination which are made in parallel by the determiner 108. In the first blank condition blank1, if the inter-edge clock pulse number is larger than the first predetermined value n1, the determiner 108 determines that the current signal is a blank signal. In the second blank condition blank2, the inter-edge clock pulse number should be larger than or equal to the second predetermined value n2 in the case that a digital reproduced signal value is positive. In this case, if the maximum value detected in the maximum value/minimum value detector 106 is smaller than the preset first threshold value TH1, the determiner 108 determines that the current signal is a blank signal. In the third blank condition blank3, the inter-edge clock pulse number should be larger than the second predetermined value n2 in the case that the digital reproduced signal value is negative. In this case, if the detected minimum value is larger than the preset second threshold value TH2, the determiner 108 determines that the current signal is a blank signal.

The first and second predetermined values n1 and n2 have the values presented in the following Table 1 according to the type of disc loaded. That is, according to whether the current disc is a CD or a DVD.

TABLE 1

|  | CD | DVD |
|---|---|---|
| n1 | 16~64T | 18~64T |
| n2 | 6~11T | 7~14T |

The operational principle of the blank detection circuit shown in FIG. 2 will be described below with reference to FIG. 3.

The signal recorded on the surface of a disc is binary data but an electrical signal with respect to the light reflected from the disc has an optical transfer function (OTF). As a result, the amplitude is small for a signal having a statistically short-term period and the amplitude is large for a signal having a statistically long-term period. Thus, if the optical disc is a CD, the signal period exists until 3T~11T on the basis of a unit clock T. The signal above 6T (the value of n2 in the CD) swings at the maximum amplitude.

Figure 3:
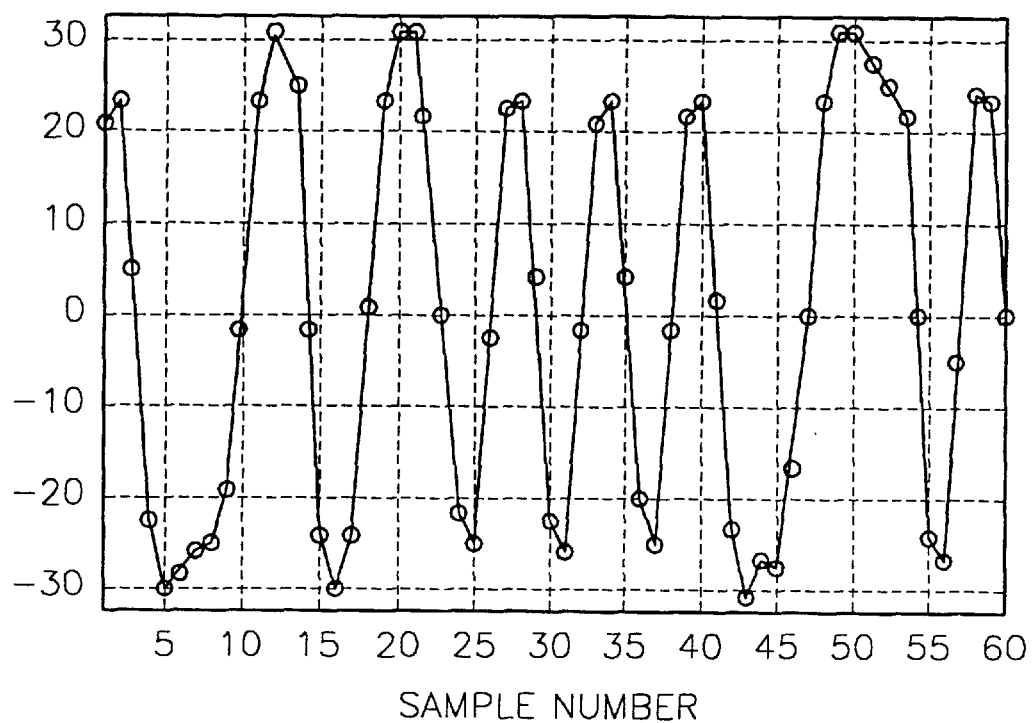
FIG. 3 is a graphical view showing the result of the analog-to-digital conversion of the RF signal in an analog-to-digital converter shown in FIG. 2.

An example of converting the input RF signal from an analog signal to a digital signal by the ADC 102 shown in FIG. 2 is shown in FIG. 3. In the case that the period of the input signal is short, the amplitude is small. It can be seen that the signal above a certain period has a substantially constant maximum value. Thus, the edge of the input signal is detected to extract only a signal above a certain period (in the case that the inter-edge clock pulse number is larger than the n2 value). Then the maximum or minimum value is obtained with respect to the extracted signal. This maximum or minimum value is compared with the preset threshold value to detect a blank.

Also, the input signal is designed so that a signal above 11T in the case of a CD and a signal above 14T does not turn up statistically in the case of a DVD. A blank signal can be regarded as being a case in which the signal is not detected for a long time period for any reason. Thus, if the inter-edge clock pulse number exceeds a predetermined value, the current signal is processed as a blank signal, of which the predetermined value is expressed as n1 in Table 1.

Figure 4:
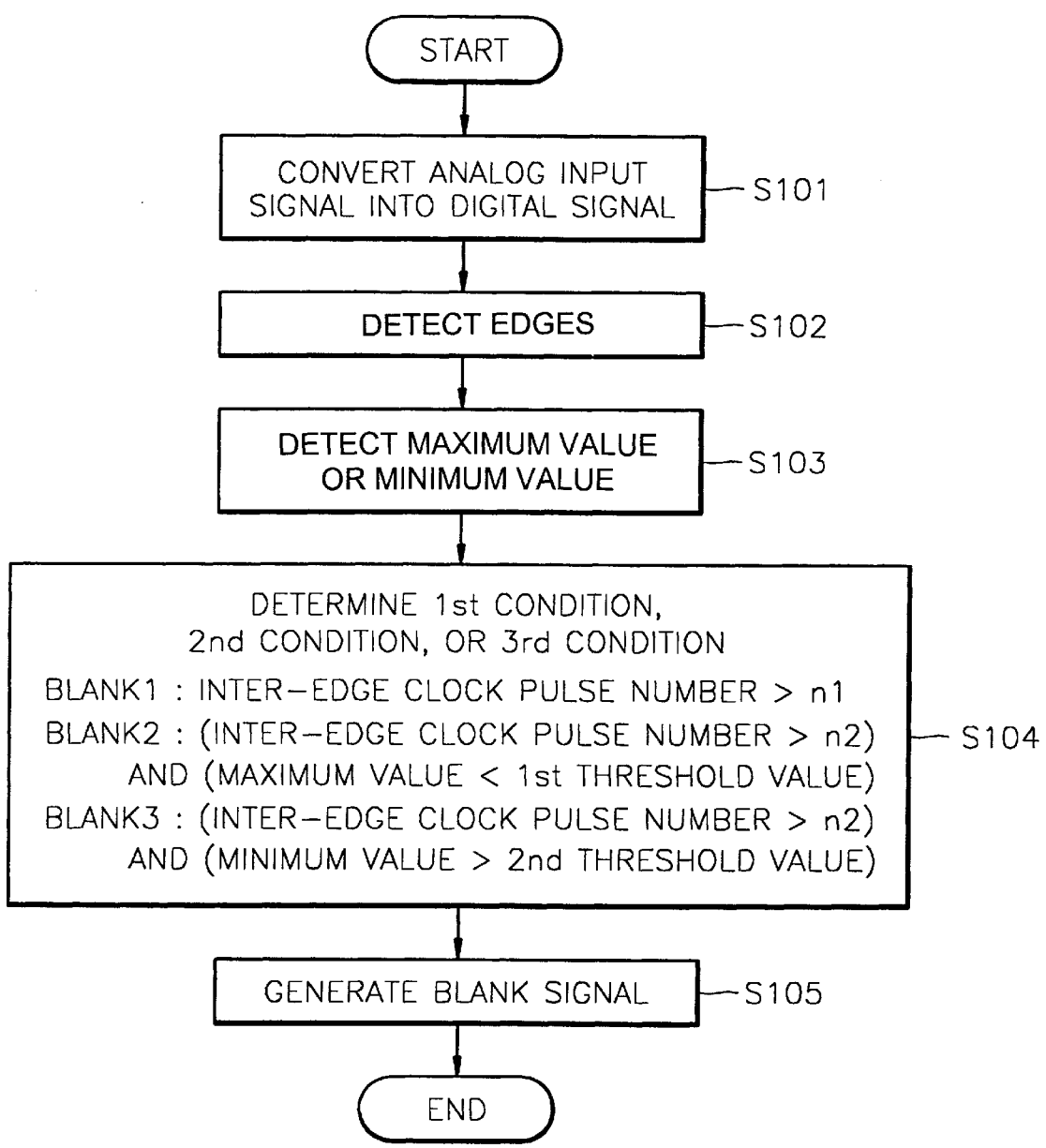
FIG. 4 is a flowchart showing a blank detection method according to an embodiment of the present invention.

FIG. 4 is a flowchart explaining a blank detection method according to the embodiment of the present invention. An input RF signal is converted into a digital signal by the ADC 102 (step S101). Edges of the digital reproduced signal are detected and the number of clock pulses between adjacent edges is counted by the edge detector 104 (step S102). Also, the maximum value or minimum value with respect to the amplitude of the digital reproduced signal is detected by the maximum value/minimum value detector 106 (step S103). The maximum value is used when the reproduced signal is positive, whereas the minimum value is used when the reproduced signal is negative. The maximum value/minimum value detector 106 determines whether the reproduced signal output from the ADC 102 is positive or negative in response to each edge detected in the edge detector 104, detects the maximum-value when the reproduced signal is positive and detects the minimum value when the reproduced signal is negative.

In step 104, if the inter-edge clock pulse number obtained in step S102 is greater than a first predetermined value n1, the digital reproduced signal is determined as a blank signal corresponding to a first condition blank1 by the determiner 108. Otherwise, the inter-edge clock obtained in step S102 is compared with a second predetermined value n2. Then, in the case that the input signal has a period longer than a predetermined period, that is, n2=6T~11T in the case of a CD and n2=7T~14T in the case of a DVD, and if the maximum value detected in step S103 is smaller than a first threshold value TH1, it is determined as a blank signal corresponding to a second condition blank2. Otherwise, the inter-edge clock pulse number obtained in step S102 is compared with the second predetermined value n2. Then, if the input signal has a period longer than the predetermined period and the minimum value detected in step S103 is greater than a second threshold value TH2, it is determined as a blank signal corresponding to a third condition blank3 (step S104). If the result determined in step S104 meets any one of the first condition blank1, the second condition blank2 and the third condition blank3, a blank signal is generated by the blank signal generator 110 (step S105). The above comparisons are made in parallel although they do not need to be. Although not shown in the drawings, the above process is repeated until a reproduced signal read from the disc is the last data.

Thus, since the present invention can detect whether or not an input signal is a blank signal without using an analog low-pass filter, it can be used irrespective of the delay problem of a blank signal or the frequency band of a low-pass filter which occurs in the existing analog blank detection circuit.

As described above, since the present invention can detect a blank component of a reproduced signal read from a disc quickly, processing of an abnormal input signal can be efficiently performed. Also, the present invention generates a blank signal at an accurate point in time. Thus, in the case that the blank signal generated at the accurate point in time is used in a phase locked loop which is provided with a blank signal or a binary data decoder, reliability of the entire system is enhanced.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A blank detection circuit for detecting a blank of a reproduced signal read from a recording medium, the blank detection circuit comprising:

an edge detector which detects edges of the reproduced signal and detects an interval between the detected edges, which is an inter-edge interval;

a maximum value/minimum value detector which detects an amplitude of the reproduced signal in response to the edges, and provides a maximum value or a minimum value of the detected amplitude; and a determiner which determines whether the reproduced signal is the blank according to the inter-edge interval detected in the edge detector and/or the maximum value or minimum value detected in the maximum value/minimum value detector.

2. The blank detection circuit of claim 1, further comprising:

an analog-to-digital converter which converts the reproduced signal into a digital signal and provides the digital reproduced signal to said edge detector and said maximum value/minimum value detector; and a blank signal generator which generates a blank signal in response to the blank output by said determiner.

3. The blank detection circuit of claim 1, wherein said determiner determines the reproduced signal to be the blank in a case that the interval between the edges, which is an inter-edge clock pulse number, is greater than a first predetermined value, and in response, generates a blank signal.

4. The blank detection circuit of claim 3, wherein said first predetermined value is selected among 16T~64T in a case that the recording medium is a compact disc (CD), and 18T~64T in the case that the recording medium is a digital versatile disc (DVD), wherein T is a unit clock pulse.

5. The blank detection circuit of claim 1, wherein said determiner determines the reproduced signal to be the blank if the interval between the edges has a period longer than a predetermined period indicated by an inter-edge clock pulse number being larger than a second predetermined value in a case that the reproduced signal is positive, and the maximum value from the maximum value/minimum value detector is smaller than a preset first threshold value, and in response, provides a blank signal.

6. The blank detection circuit of claim 5, wherein said second predetermined value is selected among 6T~11T in the case that the recording medium is a compact disc (CD), and 7T~14T in the case that the recording medium is a digital versatile disc (DVD), wherein T is a unit clock pulse.

7. The blank detection circuit of claim 1, wherein said determiner determines the reproduced signal to be the blank if the interval between the edges has a period longer than a predetermined period indicated by the inter-edge clock pulse number being larger than a second predetermined value in a case that the reproduced signal is negative, and the minimum value from the maximum value/minimum value detector is greater than a preset second threshold value, and in response, provides a blank signal.

8. The blank detection circuit of claim 7, wherein said second predetermined value is selected among 6T~11T in the case that the recording medium is a compact disc (CD), and 7T~14T in the case that the recording medium is a digital versatile disc (DVD), wherein T is a unit clock pulse.

9. A blank detection method of detecting a blank of a reproduced signal read from a recording medium, the blank detection method comprising:

detecting edges of the reproduced signal and detecting an interval between the detected edges, which is an inter-edge interval;

detecting an amplitude of the reproduced signal and providing a maximum value or a minimum value of the detected amplitude; and determining whether the inter-edge interval, the maximum value and/or the minimum value meet a predetermined condition, and if met, generating a blank signal.

10. The blank detection method of claim 9, wherein said reproduced signal is a digital signal sampled according to a clock signal synchronized by a phase locked loop.

11. The blank detection method of claim 9, wherein said predetermined condition is a case in which the interval between the edges, indicated by an inter-edge clock pulse number, is greater than a first predetermined value.

12. The blank detection method of claim 11, wherein said first predetermined value is selected among 16T~64T in a case that the recording medium is a compact disc (CD), and 18T~64T in case that the recording medium is a digital versatile disc (DVD), wherein T is a unit clock pulse.

13. The blank detection method of claim 9, wherein said determining whether the inter-edge interval, the maximum value and/or the minimum value meet the predetermined condition comprises determining whether the interval between the edges has a period longer than a predetermined period indicated by an inter-edge clock pulse number being larger than a second predetermined value in a case that the reproduced signal is positive, and the maximum value is smaller than a preset first threshold value.

14. The blank detection method of claim 13, wherein said second predetermined value is selected among 6T~11T in a case that the recording medium is a compact disc (CD), and 7T~14T in a case that the recording medium is a digital versatile disc (DVD), wherein T is a unit clock pulse.

15. The blank detection method of claim 9, wherein said determining whether the inter-edge interval, the maximum value and/or the maximum value meet the predetermined condition comprises determining whether the interval between the edges has a period longer than a predetermined period indicated by an inter-edge clock pulse number being larger than a second predetermined value in a case that the reproduced signal is negative, and the minimum value is greater than a preset second threshold value.

16. The blank detection method of claim 15, wherein said second predetermined value is selected among 6T~11T in a case that the recording medium is a compact disc (CD), and 7T~14T in a case that the recording medium is a digital versatile disc (DVD), in which T is a unit clock pulse.

17. A blank detection circuit for detecting a blank of a reproduced signal read from a recording medium, the blank detection circuit comprising:
 an edge detector which detects edges of the reproduced signal and detects an interval between the detected edges, which is an inter-edge interval;
 a determiner which determines whether the reproduced signal is the blank according to the inter-edge interval detected in the edge detector; and
 a maximum value/minimum value detector which detects an amplitude of the reproduced signal according to the inter-edge interval, and provides a maximum value or a minimum value of the detected amplitude;
 wherein said determiner compares the inter-edge interval with a predetermined value if the reproduced signal is positive, compares the maximum value with a threshold value if the inter-edge interval exceeds the predetermined value, and provides the blank if the maximum value is less than the threshold value.

18. The blank detection circuit of claim 17, further comprising:
 an analog-digital converter which converts the reproduced signal into a digital signal and provides the digital reproduced signal to said edge detector prior to said edge detector detecting the edges.

19. The blank detection circuit of claim 17, wherein said determiner compares the inter-edge interval with a second predetermined value, and determines the reproduced signal to be the blank if the inter-edge interval exceeds the second predetermined value.

20. A blank detection circuit for detecting a blank of a reproduced signal read from a recording medium, the blank detection circuit comprising:
 an edge detector which detects edges of the reproduced signal and detects an interval between the detected edges, which is an inter-edge interval; and
 a determiner which determines whether the reproduced signal is the blank according to the inter-edge interval detected in the edge detector; and
 a maximum value/minimum value detector which detects an amplitude of the reproduced signal according to the inter-edge interval, and provides a maximum value or a minimum value of the detected amplitude;
 wherein said determiner compares the inter-edge interval with a predetermined value if the reproduced signal is negative, compares the minimum value with a threshold value if the inter-edge interval exceeds the predetermined value, and provides the blank if the minimum value is greater than the threshold value.

21. The blank detection circuit of claim 20, wherein said determiner compares the inter-edge interval with the second predetermined value if the reproduced signal is negative, compares the minimum value with a second threshold value if the inter-edge interval exceeds the second predetermined value, and provides the blank if the minimum value is less than the second threshold value.

22. A blank detection method of detecting a blank of a reproduced signal read from a recording medium, the blank detection method comprising:
 detecting edges of the reproduced signal and an interval between the detected edges, which is an inter-edge interval;
 determining whether the reproduced signal is the blank based upon the inter-edge interval;
 detecting an amplitude of the reproduced signal according to the inter-edge interval; and
 providing a maximum value or a minimum value of the detected amplitude;
 wherein the determining whether the reproduced signal is the blank comprises:
  comparing the inter-edge interval with a predetermined value if the reproduced signal is positive, comparing the maximum value with a threshold value if the inter-edge interval exceeds the predetermined value, and providing the blank if the maximum value is less than the threshold value.

23. The blank detection method of claim 22, wherein the determining whether the reproduced signal is the blank comprises:
 comparing the inter-edge interval with a second predetermined value; and
 determining the reproduced signal to be the blank if the inter-edge interval exceeds the second predetermined value.

24. The blank detection method of claim 22, wherein the detecting of the edges of the reproduced signal comprises:
 detecting a sign of the reproduced signal; and
 determining a point where the detected sign changes as one of the edges.

25. A blank detection method of detecting a blank of a reproduced signal read from a recording medium, the blank detection method comprising:
 detecting edges of the reproduced signal and an interval between the detected edges, which is an inter-edge interval;
 determining whether the reproduced signal is the blank based upon the inter-edge interval;
 detecting an amplitude of the reproduced signal according to the inter-edge interval; and
 providing a maximum value or a minimum value of the detected amplitude;
 wherein the determining whether the reproduced signal is the blank comprises:

comparing the inter-edge interval with a predetermined value if the reproduced signal is negative, comparing the minimum value with a threshold value if the inter-edge interval exceeds the predetermined value, and providing the blank if the minimum value is greater than the threshold value.

26. A blank detection circuit for detecting a blank of a reproduced signal read from a recording medium, the blank detection circuit comprising:

an analog-to-digital converter which converts the reproduced signal to a digital reproduced signal; and a blank detector which determines whether the digital signal reproduced is the blank by comparing a timing in changes of a sign of the digital reproduced signal with a first predetermined value if the reproduced signal is positive, comparing the maximum value with a first threshold value if the inter-edge interval exceeds the first predetermined value, and providing the blank if the maximum value is less than the first threshold value, or comparing the timing in changes of the sign of the digital reproduced signal with a second predetermined value if the reproduced signal is negative, comparing the minimum value with a second threshold value if the inter-edge interval exceeds the second predetermined value, and provides the blank if the minimum value is greater than the second threshold value.

* * * * *